United States Patent [19]
Berthold et al.

[11] Patent Number: 5,367,168
[45] Date of Patent: Nov. 22, 1994

[54] METHOD FOR DISCRIMINATION AND SIMULTANEOUS OR SEPARATE MEASUREMENT OF SINGLE OR MULTIPLE ELECTRONIC EVENTS IN AN OPTO-ELECTRONIC DETECTOR

[75] Inventors: Fritz Berthold, Pforzheim; Manfred Pfleger, Wildbad, both of Germany

[73] Assignee: Laboratorium Prof. Dr. Rudolph Berthold GmbH & Co. KG, Bad Wildbad, Germany

[21] Appl. No.: 92,804

[22] Filed: Jul. 19, 1993

[30] Foreign Application Priority Data

Jul. 18, 1992 [DE] Germany ................ 4223773

[51] Int. Cl.$^5$ ............................................. G01D 21/00
[52] U.S. Cl. ................................ 250/362; 250/369
[58] Field of Search ............ 250/362, 363.01, 363.09, 250/369; 364/413.24

[56] References Cited

U.S. PATENT DOCUMENTS 4,882,680 11/1989 Bonnefoy-Claudet et al. .................................. 364/413.24
5,012,082 4/1991 Watanabe ....................... 250/369

FOREIGN PATENT DOCUMENTS

425767A1 4/1993 European Pat. Off. .
2263767 4/1993 United Kingdom .

OTHER PUBLICATIONS

Landis et al., Nuclear Instruments and Methods 33 (1965) 303–305.
Van Zurk et al; Nuclear Instruments and Methods 120 (1974) 61–68.
Siegenthaler; Nuclear Instruments and Methods 71 (1969) 173–186.
Knoll; Radiation Detection and Measurement, John Wiley & Sons, pp. 225, 598–599 (1972).
Knoll, Radiation Detection and Measurement; John Wiley & Sons; pp. 215–218, 226–227, 259–260, 646–647. (1972).

Primary Examiner—Paul M. Dzierzynski
Assistant Examiner—Richard Hanig
Attorney, Agent, or Firm—Spensley Horn Jubas & Lubitz

[57] ABSTRACT

A method for discrimination and simultaneous or separate measurement of single or multiple electronic events in an opto-electronic detector, such as a photo-multiplier, wherein information for the discrimination of these events is obtained from the signal progression occurring at the detector output within a predeterminable time window. According to this method, a characteristic parameter ($T_M$; $t_b - t_a$) is obtained for the temporal "center of gravity" of the progression of the signal itself or its integral over the time window ($T_F$), the value of which is compared with a reference value ($T_S$; $C_1$) which this parameter assumes during a single photoelectron event.

11 Claims, 5 Drawing Sheets

METHOD FOR DISCRIMINATION AND SIMULTANEOUS OR SEPARATE MEASUREMENT OF SINGLE OR MULTIPLE ELECTRONIC EVENTS IN AN OPTO-ELECTRONIC DETECTOR

FIELD OF THE INVENTION

The invention relates to a method for discrimination and simultaneous or separate measurement of single or multiple electronic events in an opto-electronic detector, such as a photo-multiplier, wherein information for the discrimination of these events is obtained from the signal progression occurring at the detector output within a predeterminable time window.

BACKGROUND OF THE INVENTION

Such a method is of particular importance for measuring radioactive radiation with a scintillator. Therefore, in what follows, scintillation measurements will be the example which serves as a basis for explanations and discussions of the problem setting.

Scintillation measurements are one of the best known and oldest methods for detecting radioactive radiation of the different types and from different sources, for example, alpha, beta or gamma radiation, and also neutrons. In the reference by Glenn F. Knoll "Radiation Detection and Measurement", 2nd. Ed., John Wiley & Sons, 1989, page 215 et seq., the bases and measuring processes are extensively described. Reference will be made in what follows to individual sections of this reference which are of special interest here.

For measuring radioactive radiation, radiation arriving in the scintillator is used to raise electrons to a higher energy level, from where they subsequently revert (in accordance with a decay time) back to the original, non-exited state (basic state) while emitting photons. The photons generated in this manner then trigger electrons in an opto-electronic detector associated with the scintillator, the electrons are multiplied in the detector so that discrete output pulses, which are superimposed to a greater or lesser degree, are generated for each photoelectron, and these pulses can be registered following further external amplification.

Depending on the incidence energy of the radioactive radiation to be detected, the latter is able to excite a certain number of molecules in the scintillator in this way, and as a consequence a number of photons will act in a statistical sequence on the detection plane of the opto-electronic detector (for example the photo-electric layer of a photo-multiplier, an avalanche photo-diode or a microchannel plate amplifier) in order to trigger electrons, namely the photoelectrons, there.

When using a photo-multiplier as the opto-electronic detector, it is basically true that after passage through the photo-multiplier dynodes (amplifier stages), individual photoelectrons generate output signals in an approximately symmetrical temporal progression. Although their amplitude depends on the amplification process of the dynodes, their pulse shape with a defined half-width value is essentially constant.

If therefore a number N of molecules is excited in the scintillator by the incident radiation to be detected, the pulses resulting from the generated photoelectrons are superimposed to form a signal the integral value of which is a measurement of the energy of the incident radiation to be measured.

If this is displayed in a pulse height spectrum, with high energy-reach radiation a peak at relatively large pulse heights is obtained.

However, a signal progression at the detector output may also occur during a scintillation measurement which is caused by only a few photoelectrons, namely when the energy of the radiation to be detected is very low or the yield of the scintillator is very low.

Such events therefore cause a signal progression with considerably lower pulse height, which in the pulse height spectrum is distributed among small amplitude values.

In the pulse height spectrum such pulses then overlap those generated by radiation which is not to be detected and is generated by individual photoelectron events. Such single photoelectron events are caused by the thermal emission of electrons from the photo-cathode, for example, or by the emission of individual photons from excited states with long decay times of the scintillator (so-called afterglow).

A highly sensitive measurement of weakly energetic radiation can be considerably impaired by this (Knoll, page 259/260). It is decisive that, depending on the electron amplification, in particular of the first dynode of the photo-multiplier, relatively large half-width values appear in the pulse height spectrum. The direct consequence of these conditions is:

a. When the radiation to be detected is of sufficiently high energy to trigger at least approximately four electrons in the photo-sensitive layer of the photo-multiplier, a sufficient distance between the above mentioned single photoelectron peaks (caused by the so-called interference pulses) on the one hand, and the multiple photoelectron peak (as usable signal) on the other hand will be present in the pulse height spectrum in spite of the system-specific half-width values, and the unwanted single photoelectron events can be easily eliminated by pulse height discrimination.

b. However, if the radiation to be detected is low in energy (such as with tritium as a beta radiation source or with 55 Fe as a gamma radiation source), so that the pulse amplitude reaches the order of the pulse amplitudes of single photoelectrons, this can result in that the two peaks in the pulse height spectrum intermingle to such an extent that pulse height discrimination is unsuitable for detecting a difference between the ionizing radiation signal and the "single photoelectron noise".

As known from the cited reference, for photoelectron events the width of the peak essentially depends on the secondary electron amplification $\delta$ of the first dynode of the photo-multiplier. The overlap of the peaks mentioned, which prevents a clear discrimination, can therefore be reduced if, when a photo-multiplier is employed, the first dynode has a particularly high secondary electron amplification $\delta$. This can be achieved, for example, by the use of so-called NEA material for the first dynode. With this it is possible to achieve $\delta$ amplification factors of 15 to 20, while standard dynodes only have a $\delta$ amplification factor of approximately 4 to 6.

An opportunity is provided by this to reduce the half-width values of a five-photoelectron event and a single photoelectron event, for example, at a correspondingly greater constructive expense, sufficiently so that it becomes possible to set a reasonable threshold for pulse height discrimination. However, the improvement achieved by means of NEA dynodes is not sufficient to separate an event resulting from two electrons from a single photoelectron event. As a result of the noise of the photo-cathode and a large number of single photons from the scintillator, the number of single electron events is so high that the resulting peaks of the single photoelectron events and the multiple photoelectron events overlap to such an extent that it is no longer possible to set a meaningful discrimination threshold.

A further improvement in the sense of a separation of single photoelectron events from multiple photoelectron events can be achieved through a further increase, namely by means of a coincidence measurement, for which two photo-multipliers are spatially associated with the scintillator. In the course of this only those pulses are evaluated which, within a preset time window, are registered by the first as well as the second photo-multiplier. In this way it is assuredly possible to exclude single photoelectron events. However, for statistical reasons the detection sensitivity of such an arrangement also decreases with the decrease in energy of the radiation to be detected. With radiation to be detected which generates two photoelectrons, there is a 50% probability that the second photoelectron is generated in the same photo-multiplier as the first, so that this event is not registered although it stems from the radiation to be detected.

Furthermore, the use of two photo-multipliers, for example in a portable detector for measuring dose rate, is very awkward. In addition, the two photo-multipliers screen each other in respect to external radiation so that such an arrangement is only usable in a limited manner in case of measuring external X-ray radiation, for example.

Several solutions have been proposed in various issues of the periodical "Nuclear Instruments and Methods" (NIM) for solving these problems, all of which utilize preset discrimination criteria between single electron events and multiple electron events, after which they provide a more or less dependable discrimination with the goal of eliminating the "single electron noise" by suitable discrimination methods and corresponding circuitry:

NIM 33 (1965), pp. 303 to 305, describes the use of rise time of pulses of the photo-multiplier noise as the discrimination criterion, which is said to be considerably less than with useful signals of the scintillator.

NIM 120 (1974), pp. 61 to 68 describes use of pulse length as the discrimination criterion, and NIM 71 (1969) pp. 173 to 186, suggests to compare the amplitudes of an integrated dynode output signal with the amplitude of a discriminated anode output signal in order to detect electron events and to eliminate them.

All these methods may operate dependably when the pulses to be discriminated have sufficient time spacing from each other, however with overlaps there no longer is a dependable discrimination.

A similar situation arises with the method in accordance with European Patent Disclosure EP 0 425 767 A1 wherein, for discriminating between single electron event and a multiple electron event, a check is made by means of a digital circuit whether within a preset time window one or several discrete single pulses occur. If only a single pulse occurs, the result is excluded from the subsequent evaluation as being a noise pulse, while a useful signal is identified by the occurrence of several single pulses.

This already causes the difficulty, as described at col. 5, lines 7, et. seq. of the above-cited European Patent, that it is necessary to take additional technical circuit measures to detect a signal progression which appears to be a single pulse, but is the result of a multiple electron event (and thus a true scintillation event), and to admit it for evaluation. For this purpose a sequence of "replacement pulses" is generated during the length of this pulse progression above a certain threshold, which so to speak simulate the multiple electron event "hidden" in the signal progression.

Aside from additional cost, the proposed solution with its digital circuit concept can only be used in a limited way, because a signal progression only allows the conclusion that there had been two pulses (and thus a "two-photoelectron event") if the distance between these pulses is at least 10 ns (col. 6, lines 40 et seq of the European Patent.). This therefore limits the range of utilization of the known method to scintillators with decay times of at least 15 ns. Thus this method is unsuited for the most frequently used plastic and fluid scintillators, the decay times of which mostly are below 5 ns.

SUMMARY OF THE INVENTION

It is therefore an object of the invention to provide an improved processing method which makes it possible to utilize rapid scintillators with short decay times.

The above and other objects are acheived, according to the invention, by a method for discrimination and measurement of single electron and multiple electron events in an opto-electronic detector having an output providing a signal representing each event, each signal being associated with a "center of gravity" which has a time coordinate, which method includes;

creating a time window having a selected duration commencing with the beginning of each signal at the output;

determining a parameter value of each signal dependent on the time coordinate of the center of gravity of the signal within the time window; and comparing the parameter value with a reference value corresponding to the parameter value for a single electron event.

The basic concept of the invention lies in the realization that the temporal "center of gravity", which term is employed herein because of its conceptual and mathematical similarity to the center of gravity of a solid body, as will be explained in greater detail below, of the signal occurring at the anode output of a photo-multiplier is very constant in the case of a single photoelectron event and in any case has lower values than the center of gravity of signals originating from a multiple photoelectron event. This opens the possibility of using this property of single or multiple photoelectron events for their discrimination by placing a threshold closely above a reference value of a parameter which characterizes the center of gravity of the single photoelectron events and admitting for evaluation as true scintillation events, only those events whose parameter values lie above this threshold, while the events below the threshold are eliminated as noise components or can be used for single photon measurement or for noise compensation (center of gravity discrimination).

Thus it is important to generate a signal, the parameter of which to be evaluated is determined by the temporal position of the center of gravity (for example a period of time or an amplitude). In this case there need not be a linear relation between the position of this center of gravity and the parameter to be evaluated nor need the position of the center of gravity even be measured. It is sufficient to have a connection between the parameter and center of gravity of the signal which permits a clear association between the two in a sense that signals with a center of gravity above the center of gravity of the single photoelectron event lead to parameter values above the reference value (threshold).

A broad range of uses can be covered with the attainment of the basic object in accordance with the invention.

First it is possible, for example in a combination of plastic scintillators with photo-multipliers, to measure gamma, beta or X-ray radiation down to an energy of 1 to 2 keV without interference, i.e. without the effect of single photons generated in the scintillator, or of electrons which are thermally emitted by the photo-cathode. Thus it is possible to perform a very sensitive measurement of weak energy radiation, in which the single photoelectron pulses represent the interference pulses and the multiple photoelectron pulses the useful pulses.

The simultaneous and separate measuring of the single photoelectron events and multiple photoelectron events also permits the simultaneous and separate measurement of light and radioactivity. A practical use is the simultaneous and separate measurement of luminescence and radioactive markers, for example in immunoassays.

A measuring instrument for microtest plates (microplates) can be a practical exemplary embodiment. A photo-multiplier (or an avalanche photo-diode or a micro-channel plate amplifier) is located above (in case of opaque microplates) or below (in case of transparent microplates with light absorbers between adjoining positions) the samples. A center of gravity discriminator provides output signals for single photoelectron events and multiple photoelectron events, the latter preferably being interference-compensated. A device of this type can be used for scintillation measurements, for luminescence measurements (bio- and chemical luminescence, fluorescence, phosphorescence), as well as for separate and simultaneous scintillation and luminescence measurements.

The method of the invention can also advantageously be used when very large scintillators are employed, in which case the light collection is necessarily inferior and the pulses even of higher energy radiation become so small that they can no longer be separated from the background, caused by single photoelectrons, with the aid of pulse height discrimination. This occurs for example during radiometric fill level measurement with rod scintillators which can have a length of up to more than 1 m.

During fluid scintillation measurements (it is possible to also measure the scintillations of solid material scintillators with so-called fluid scintillation counters), the possibilities of use are universal. It is possible, for example, to measure scintillations not only from microplates, but also from individual sample vessels.

Cherenkov radiation is another type of radiation which can be identified and measured by the method in accordance with the invention. Cherenkov radiation is generated when high-energy particles in a defined medium have a speed lying above that of light in this medium. This effect is used, for example, for measuring beta particles of the radioisotope Phosphorus 32 by means of fluid scintillation counters (where no scintillator is required). In this example only a few photons are generated and the pulse height approximately corresponds to that which is generated by tritium in a fluid or solid scintillator.

With the Cherenkov effect the photons are generated so rapidly (on an order of magnitude of $10^{-14}$ sec), that in comparison to the temporal resolution of opto-electronic detectors they appear practically simultaneously. If a plurality of photoelectrons are generated, pulses which are longer than those of single electrons can be measured nevertheless. The following effect is responsible for this, for example in the case of photo- multipliers: the excursion time of the electrons from the cathode to the first dynode depends, even though to a limited extent, on the location of the photoelectron emission. Statistically, during multiple photoelectron events, the electrons are generated at different places of the photocathode and the result therefore is slightly longer pulses than with single photoelectron events. This effect can be increased or kept at a minimum, depending on the requirements, by the selection of the type of photo-multiplier and of the working parameters, in particular the voltage potential between the cathode and the first dynode. This even results in the possibility to discriminate between the Cherenkov radiation from single photoelectron events as well as scintillation events and to measure them separately, if required. This means that the shortest pulses stem from single electrons, the longest from scintillations and the range of the Cherenkov radiation is located between them.

Expressed generally, it is possible in this way by means of the center of gravity discrimination to distinguish all radiations from each other, as long as they result either in single photoelectron pulses or multiple photoelectron pulses in the course of measurement with the detector.

For performing the center of gravity discrimination, while observing the above described bases, it is possible, for example, to employ a double-delay circuit with a downstream crossover carrier or a constant fraction discriminator circuit, as will be described further down.

The technology of pulse shaping (pulse shape discrimination) is described in detail in Knoll, supra, pages 646, 647. For example, it is possible with the aid of a double-delay line pulse shaping to obtain a characteristic time value (time period between pulse onset and crossover of the pulse) from the pulse shape, namely the rise time. With the aid of this characteristic time value it is possible to discriminate between different types of radiation which have resulted in photoelectrons and to which typical pulse shapes can be assigned (for example, see Knoll, supra, pages 226, 227).

Pulse-shape discrimination methods are also known for other purposes.

As already suggested above, however, applicants have found for the first time that this method is also suitable for the realization of the inventive concept in respect to the desired discrimination between single photoelectron events and multiple photoelectron events, i.e. that the characteristic time value detected there can be used as a characteristic parameter for the center of gravity discrimination.

Another circuit with which it is possible to obtain a characteristic parameter for discriminating between single photoelectron events and multiple photoelectron events uses the technology of "constant fraction discrimination". This circuit principle is generally employed for obtaining an exactly timed output signal, independently of the amplitude of the pulse.

For this purpose a constant fraction discriminator is adjusted so that the output signal appears at a defined time after the onset of the event to be investigated at which the pulse, integrated, if required, reaches a predetermined percentage of the maximum height reached within a fixed time window.

By means of the combination in accordance with the invention of two constant fraction discriminators, set respectively to a percentage a and b, it is therefore possible to generate a time difference between reaching a percent (for example 20%) and b percent (for example 80%) of the maximum amplitude as the characteristic parameter for the separation of single photo-electron events and multiple photo-electron events.

Two exemplary embodiments for executing the method of the invention will be described with reference to the drawings.

DESCRIPTION OF THE PREFERRED EMBODIMENTS

Figure 1:
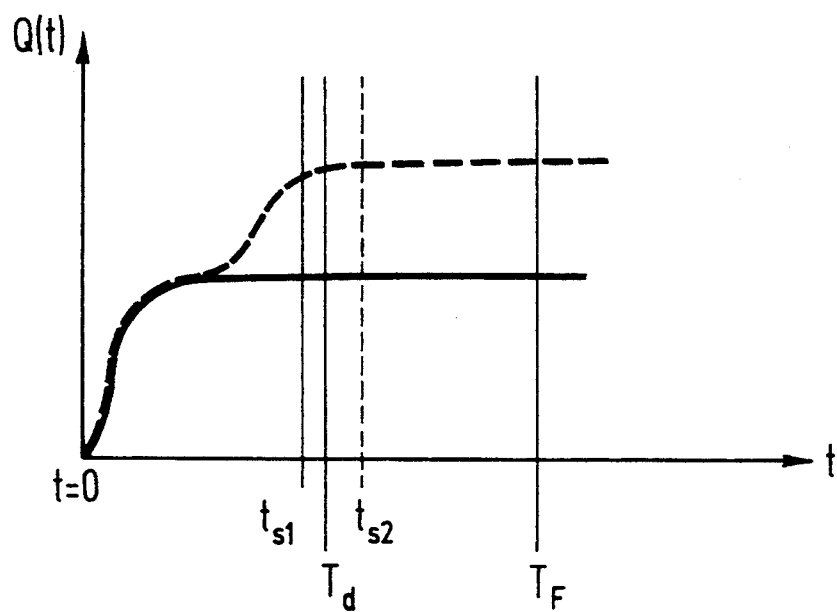
FIG. 1 is a waveform diagram illustrating the principle of the method of the invention.

FIG. 1 shows the time progression of an integrated current signal Q(t), for example, from the anode of a photo-multiplier, which corresponds to a single photoelectron (solid line) and the progression of an integrated current signal when two photoelectrons appear within a time window between t=0 and t=$T_F$ (dashed line).

It now has been determined that with single photo-electron events the time coordinate $t_S$ of the center of gravity of the signal always lies at smaller values ($t_{S1}$) than with multiple photo-electron events ($t_{S2}$).

All $t_S$ values are referenced to the value t=0 at the beginning of a pulse of the signal Q(t), i.e., at the beginning of a photo-electron event. This observation applies to the basic current signal i(t) itself in the same way as for signal the charge signal Q=∫ i(t) dt which corresponds to the quantity of charge transferred by the anode.

For defining the term "center of gravity" in connection with the signals, the invention uses the mathematical representation (analogously to the definition of a physical center of gravity):

$$\text{for } t_{s1}: \int_0^{t_{s1}} t \cdot Q(t) dt = \int_{t_{s1}}^{T_f} t \cdot Q(t) dt$$

$$\text{for } t_{s2}: \int_0^{t_{s2}} t \cdot Q(t) dt = \int_{t_{s2}}^{T_f} t \cdot Q(t) dt$$

The value $t_{S1}$ for single photo-electron events is very constant (±100 ps), while multiple photo-electron events have very differing $t_{S2}$ values which, however, are always greater than the $t_{S1}$ values. It is therefore possible to place a threshold $T_d$ slightly above $t_{S1}$ (for example 200 ps above $t_{S1}$), and to interpret as true scintillation events, only those producing a $t_S$ value of which is greater than $T_d$.

Figure 2:
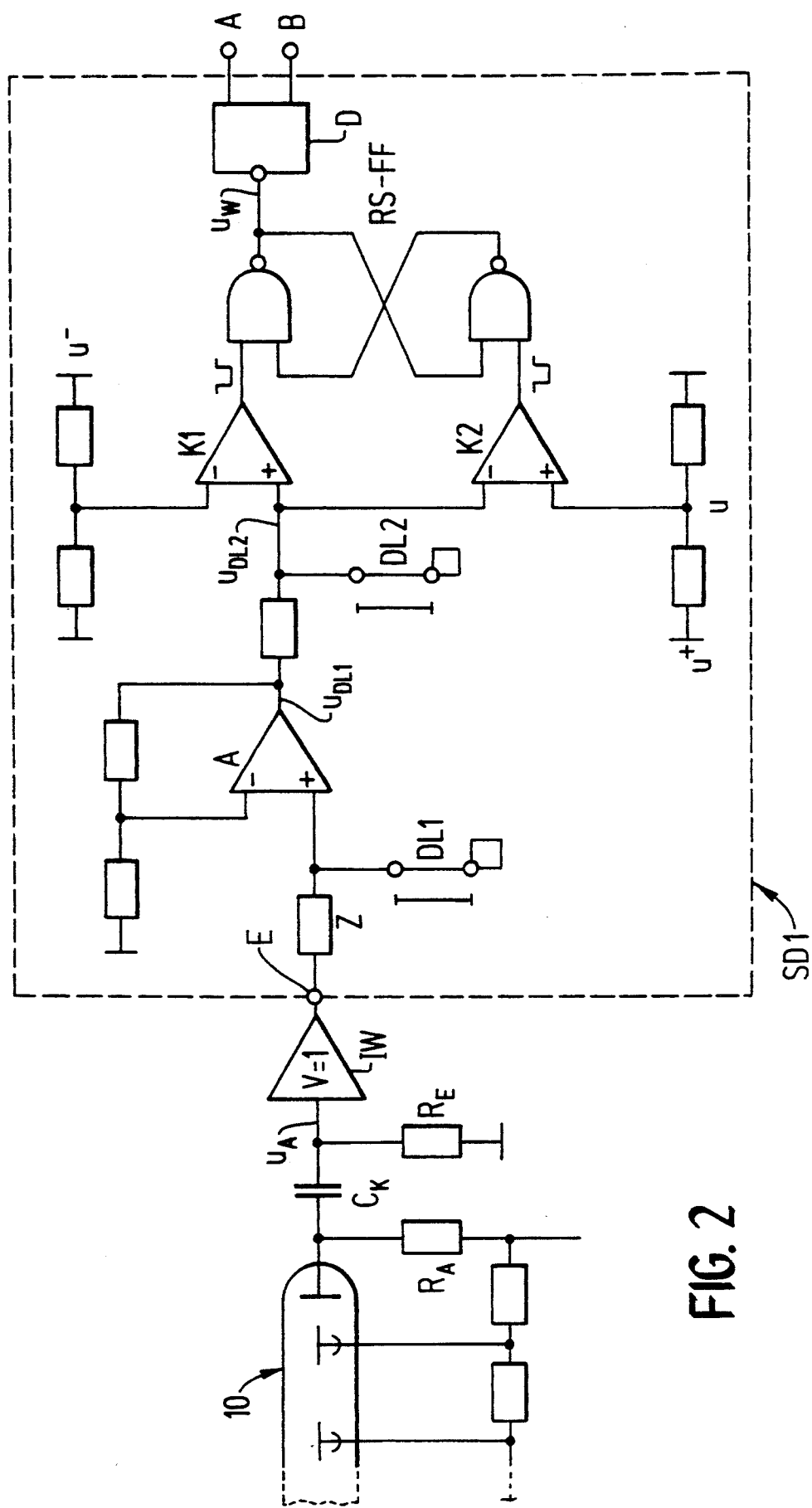
FIG. 2 is a circuit diagram of a first exemplary embodiment of a center of gravity discriminator with double-delay line pulse shaping.

A first example of a center of gravity discriminator SD1 with double-delay line pulse shaping is shown in FIG. 2 and is constructed as follows:

The output, or load, resistor $R_A$ of a photo-multiplier 10 and the input resistor $R_E$ of an impedance converter IW are selected so that together with the photo-multiplier anode capacitance a time constant $\tau_A$ results which is large in comparison to the time window to be set and thus to the decay time, or decay time constant, of the scintillator (for example three to five times larger). The decay time of a scintillator is discussed in Knoll, supra, at page 225.

A photo-multiplier output current $i_A$ (FIG. 3a) produces a signal which is decoupled via a coupling capacitor $C_K$ to form a signal $u_A$ (FIG. 3b) from the anode of the photo-multiplier 10 connected with high-voltage potential, which signal is supplied to an impedance converter IW, which has a low output impedance and is used for low impedance triggering of a first delay line DL1 via a series resistor corresponding to the impedance level Z at input E of discriminator SD1.

This first delay line DL1 is short-circuited at its other end. By means of the reflection of the signal with the same amplitude but opposite sign taking place at the end of the delay line DL1, the signal appearing at the input of the delay line DL1 is compensated with a delay corresponding to twice the travel time of the signal in the delay line DL1. This signal is amplified by means of an amplifier A into a signal $U_{DL1}$ (FIG. 3c) and is supplied to a second delay line DL2, constructed in the same way, and a differential signal is again produced. The time delay produced by each delay line DL1, DL2 is longer than the scintillator decay time. Because of the identical function of the first delay line DL1 and the second delay line DL2, a bipolar signal $u_{DL2}$ results, FIG. 3d, the width of which from the pulse onset to a zero crossover is determined by the delay time of the two delay lines DL1 and DL2 and the position of the center of gravity of the pulse at the anode of the photo-multiplier. Referring to FIG. 3e, each additional signal arriving in the time period between the first signal and the crossover increases the width of the signal $U_{DL2}$ from its onset $T_0$ (crossing a first threshold S1) to the time T of the crossover (falling below a second threshold S2).

Two voltage comparators K1, K2 and a connected RS-flipflop, RS-FF, are used to convert this analog output signal $U_{DL2}$ into a pulse signal $u_W$ of corresponding duration or width $T_S$.

Figure 3A:
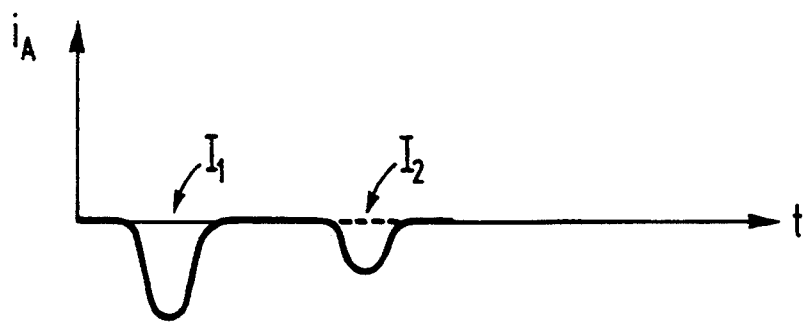
FIGS. 3a, 3b, 3c, 3d and 3e are waveform diagrams showing signals appearing there in their progress over time.
Figure 3B:
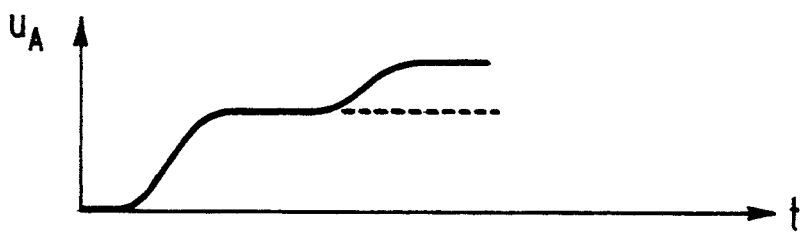
Figure 3C:
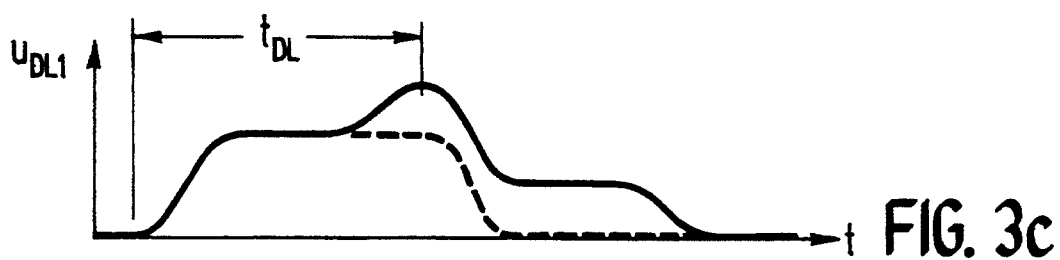

FIGS. 3a–3c show two typical signal progressions at the points of the circuit indicated in FIG. 2, wherein the solid lines represent signals produced when two pulses $I_1$ and $I_2$ appear in signal i, while the broken lines represent the signals produced when only pulse $I_1$ appears, i.e. processing of a signal which is based on a single photo-electron event.

Figure 3D:
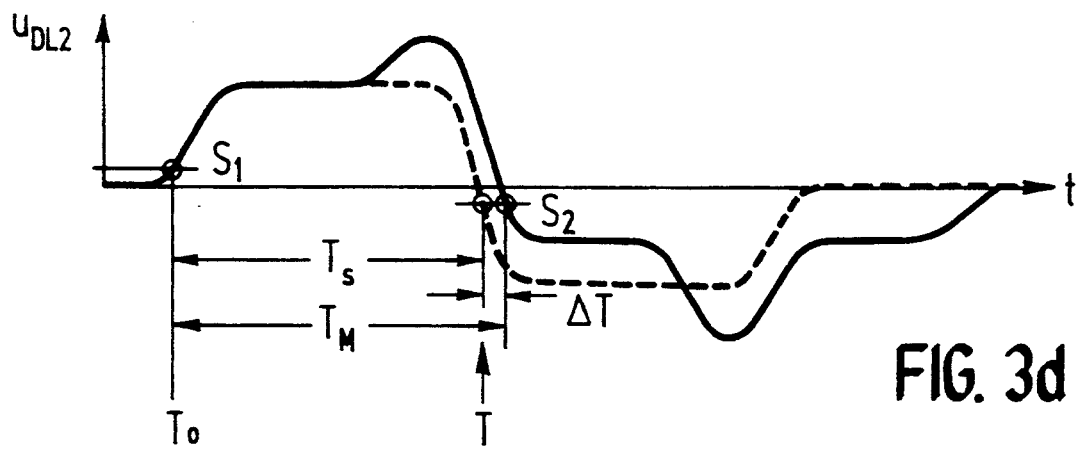
Figure 3E:
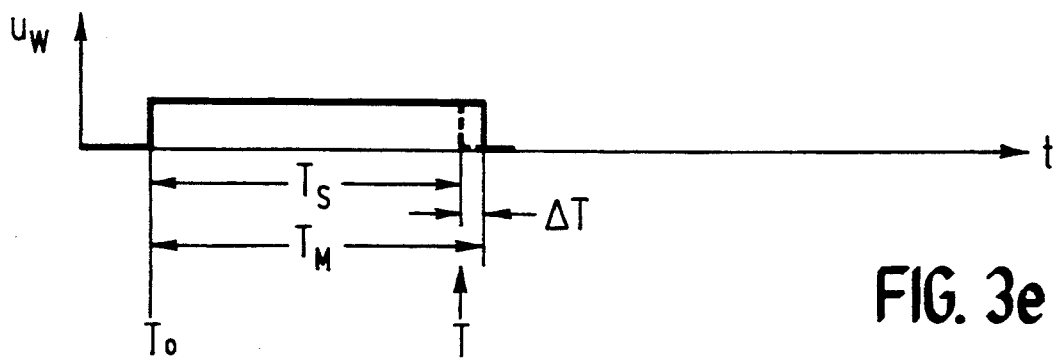

The function of the two delay lines DL1/DL2 (the delay time of each is $t_{DL}$) can be seen in FIGS. 3c and 3d. It becomes particularly clear that the period $T_S$ between signal onset $T_0$ and crossover T for the signal consisting of only a single pulse is shorter than the corresponding period $T_M$ for a signal progression consisting of two successive single pulses.

The shape and characteristics of the illustrated pulses also depend on the relative sizes of the two pulses $I_1$ and $I_2$ forming the signal. If the first pulse, $I_1$ is larger (as shown in FIG. 3a), the time difference $\Delta T$ between the two crossovers only depends on the amplitude and not the temporal location of the second pulse $I_2$. In the reversed case (not shown where $I_2$ is larger than $I_1$), the temporal location of the second pulse essentially determines the temporal position of the crossover.

It is assured in any case that the pulse signal $u_W$ has a minimum length $T_S$ if there is only one single pulse within the entire time window and the length of time $T_S$ therefore can be used as a reference value in the sense that, with a defined signal progression, a single pulse (and thus a single photo-electron event) can only be present at the output of the photo-multiplier if the length $T_M$ of the output signal $u_W$ of the described circuit exceeds the "reference duration" $T_S$ by no more than, or less than, a predeterminable value $\Delta T$. In actuality an assured recognition of single pulses and thus of single photo-electron events is possible with this, in that in the circuit of FIG. 2 the output signal $u_W$ is supplied to a discriminator stage D having a time threshold value which is the reference value $T_S + \Delta T$. Depending on the desired evaluation of the measurement it is then possible to evaluate either a single photo-electron event (output A) exclusively, or the multiple photo-electron events (as scintillation events, output B) exclusively, or a simultaneous separate evaluation of both "types" of events can take place.

Figure 4:
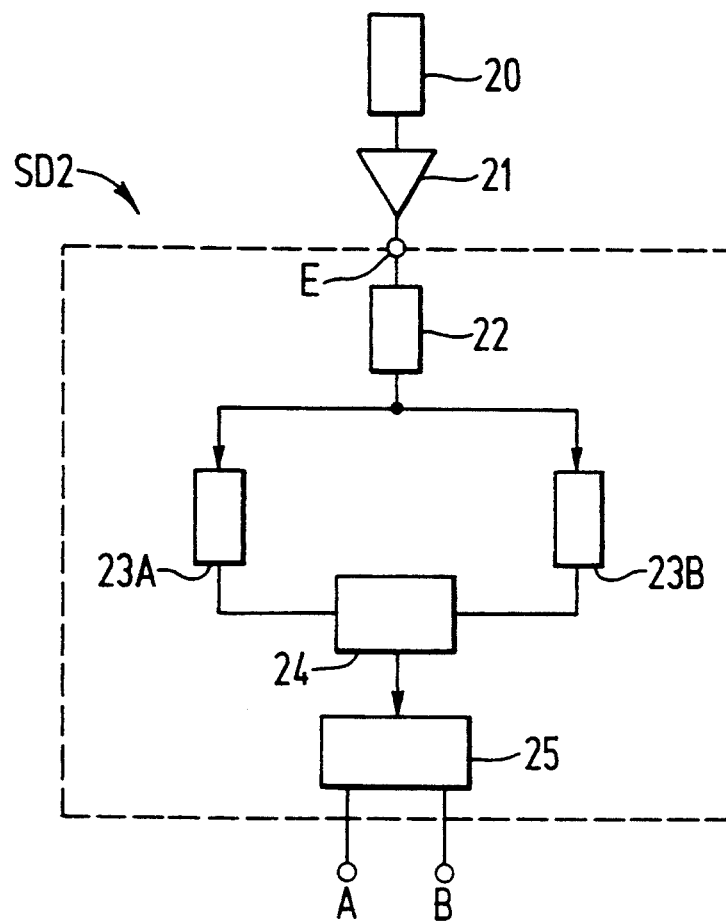
FIG. 4 is a circuit diagram of a second exemplary embodiment of a center of gravity discriminator with a constant fraction discriminator circuit.
Figure 5A:
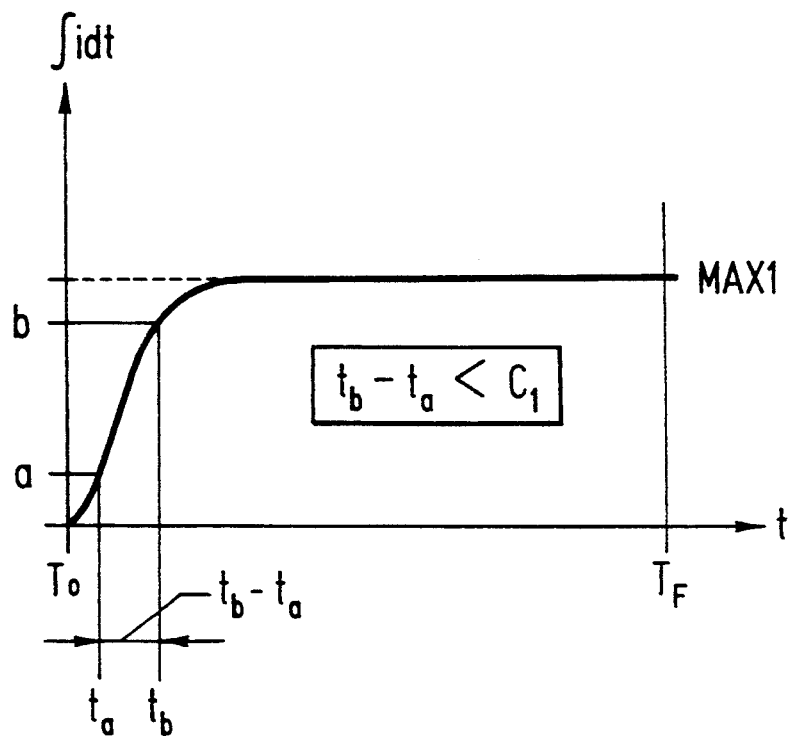
FIGS. 5a and 5b are waveform diagrams showing a schematic view of the principle of the constant fraction discriminator circuit of FIG. 4.
Figure 5B:
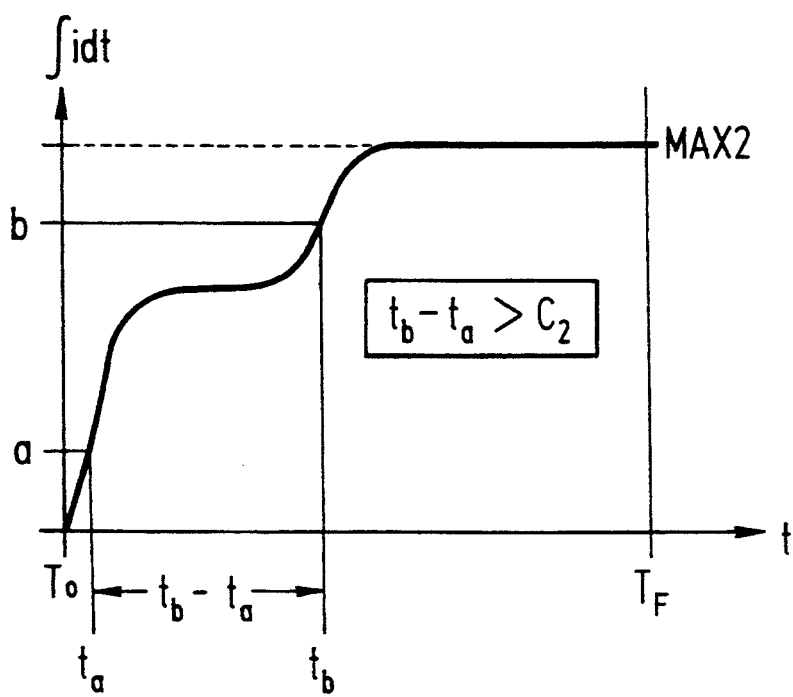

FIG. 4 and FIG. 5 show the employment of the constant fraction principle as a second possibility for assembling a center of gravity discriminator SD2.

In FIG. 4, pulses from opto-electronic detector 20 are amplified, integrated and shaped (amplifier circuit 20/21) and subsequently (input E) distributed to two constant fraction discriminators 23A and 23B. Let it be assumed that 23A is set to a percent and 23B to b percent of a maximum amplitude. In this case, referring to FIG. 5a, the output signal from 23A appears at the time $T_o + t_a$, and that of 23B at the time $T_o + t_b$. $T_o$ is a constant delay time which results from the fact that the circuit recognizes the maximum pulse height to which the constant fraction value a or b refers only at the end of the time window $T_F$. $t_a$ and $t_b$ are those times when the thresholds corresponding to a or b % of the maximum amplitude are exceeded.

A module 24 for measuring the time difference calculates the value for the difference $t_b - t_a$ (it is assumed that $b > a$ and therefore $t_b > t_a$). Pulses can be sorted in discriminator circuit 25 according to the magnitude of the time difference and supplied to two outputs A and B. A pulse appears at the output A if $t_b - t_a$ is less than a first characteristic reference value $C_1$. A pulse appears at the output B if $t_b - t_a$ is greater than a second characteristic reference value $C_2$ ($C_2$ should be greater than or equal to $C_1$).

The output signals B are again further processed as scintillation events, while the output signals A representing single photo-electron events are either not needed at all, or are used for sensitive light measurements, or are used as correction signals for the scintillation measurement.

High rates of single photo-electron events appear during certain types of scintillation measurements.

In this case it can occur, with a probability which is no longer negligible, that non-correlated single photo-electron events will appear at very short time intervals from each other within the time window and in this way generate a signal progression at the output of the photo-multiplier which, in accordance with the above described method, leads to the reference value $T_S$ being exceeded and in this way simulates a scintillation event (multiple photo-electron event). The interference rate $n_r$ (rate of multiple photo-electron events simulated by single photo-electron events) created in this way can be well described by the equation $$n_r = n^2 \cdot T_F.$$

In this case n is the rate of occurrence of the single photo-electron events and $T_F$ the time window within which searches for multiple photo-electron events are made.

Thus, the interference signal rate $n_r$ increases at the square of the rate n of the single photo-electron events. It is then possible to make a correction, for example in accordance with the following equation:

$$n_{SC}(\text{net}) = n_{SC}(\text{total}) - n_r.$$

In this case $n_{SC}$ (total) is the rate of the multiple photo-electron events, including the interference signals, identified by the circuit, and $n_{SC}$ (net) is the corrected true multiple photo-electron event rate. With the operation illustrated in FIG. 4 with two constant fraction discriminators, the pulse rate n would appear at the output A and the pulse rate $n_{SC}$ (total) at the output B.

Large amounts of multiple photo-electron events appear during fluid scintillation counting, for example, where they may be caused by interfering chemical luminescence. This applies to fluid scintillation counters for discrete samples, which are probably in sample vessels or in micro-plates, as well as to continuous fluid scintillation counting during the radioactivity measurement of column eluates. An interference correction is therefore particularly desirable in these cases.

This interference correction approximates the one known for coincidence systems with the aid of the method of delayed coincidences, but which can also be transferred to systems with only one detector.

Figure 6:
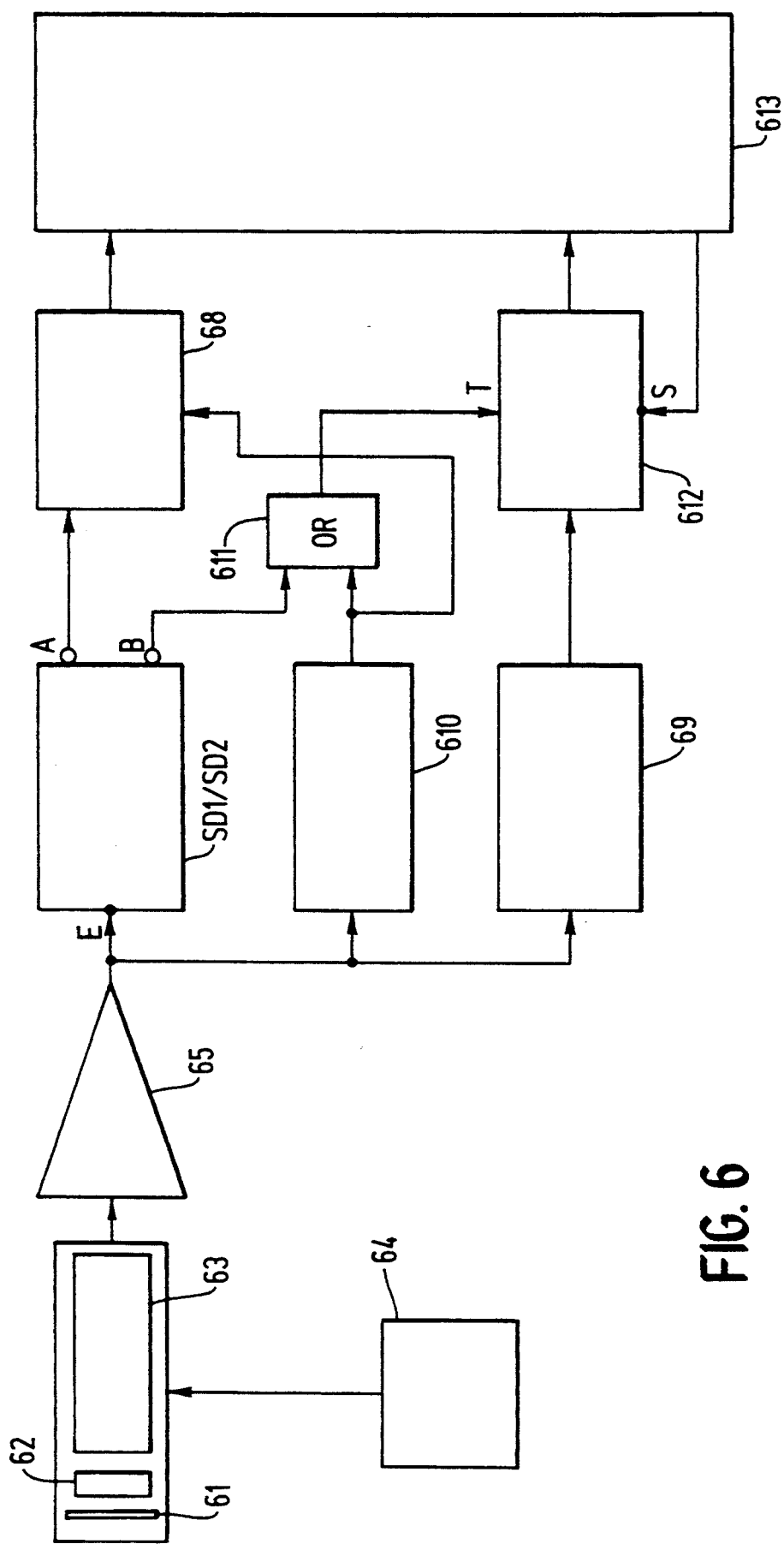
FIG. 6 is a block diagram of a radioactivity monitor utilizing the invention for column chromatography.

FIG. 6 shows a block diagram of a radioactivity monitor for column chromatography as a concrete example to illustrate the versatility of the areas of use resulting from the separation of single photo-electron events from multiple photo-electron events.

A measuring cell 62 is disposed as close as possible in front of the cathode of the photo-multiplier 63 in order to obtain maximum light yield. A mirror 61 reflects the light emitted at the rear onto the cathode of the photo-multiplier 63. The measuring cell, the mirror and the photo-multiplier are disposed in a lightproof chamber, into which the measuring cell is inserted from the outside and through the walls of which the operating voltages and the signal line extend in a lightproof manner. A high-voltage unit 64 is used for supplying the photo-multiplier 63 with the required operating voltage.

The anode signal is integrated directly at the anode (as described above) and is supplied via an impedance converter 65 to the center of gravity discriminator SD1 or SD2.

The pulses at the output A correspond to signals whose center of gravity time coordinate lies ahead of the threshold value (single photo-electron events), and pulses at the output B correspond to those which lie after the reference threshold (multiple photo-electron events).

To obtain and evaluate the energy information contained in the signal, the analog signal appearing at the output of the impedance converter 65 is amplified by means of a logarithmic gain amplifier 69 and is supplied to a pulse height discriminator 612.

It is also possible to use single-channel or multi-channel discriminators in place of the multi-channel pulse height analyzer shown in the example.

It is attained by means of signals applied to a control input T that only those pulses which are a part of a true scintillation event are evaluated. The control signal for triggering the pulse height analyzer 612 is derived from the pulses at the output B of the center of gravity discriminator SD1 or SD2 and at the output of an integral discriminator 610. These are supplied, linked via an OR-gate 611, to the input T of the pulse height analyzer 612. By means of the integral discriminator 610 these are additionally detected those pulses whose amplitudes are located far above the single photo-electron event spectrum (for example at five times the value of the single electron peak), even if they were not identifiable as scintillation pulses because of the position of the center of gravity of the pulses.

The pulses assigned to the single electron pulses appear at the output A of the center of gravity discriminator SD1 or SD2.

The rate n of the pulses appearing at the output A can be used for compensating the multiple photon events simulated by the uncorrected single photo-electron events.

For this purpose, first those pulses which cannot be caused by single electron pulses because of their amplitude, even though they correspond to the reference value for the center of gravity, are filtered out via an anti-coincidence stage 68 connected downstream.

Integral discriminator 610 may be a device of the type described in *Knoll*, supra, at pages 598 to 599.

The correction calculation takes place in a computer system 613, for example by using the above mentioned equation for $n_{SC}$(net). Computer system 613 may control, if necessary, pulse height analyzer 612 via signal line S. Computer system 613 may also serve additional purposes such as evaluating single electron event information from stage 68 and/or scintillation events from analyzer 612, depending on the measurement result desired.

In addition, the pulses from the output A can also be used for measuring photons as useful signals, for example in case of luminescence measuring, because of which the simultaneous measurement of ionizing radiation and light continues to be made possible.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for discrimination and measurement of single electron and multiple electron events in an optoelectronic detector having an output providing a signal representing each event, each signal being associated with a center of gravity which has a time coordinate, comprising:

creating a time window having a selected duration commencing with the beginning of each signal at said output;

determining a parameter value of each signal dependent on the time coordinate of the center of gravity of the signal within the time window; and comparing the parameter value with a reference value corresponding to the parameter value for a single electron event.

2. A method in accordance with claim 1, wherein the events measured are created in a scintillator in response to radiation from a radioactive source, and the signals whose parameter value is greater than the reference value are processed as scintillation events.

3. A method in accordance with claim 2 further comprising employing signals whose parameter value is not greater than the reference value to correct scintillation event measure.

4. A method in accordance with claim 3 where in said step of separately employing is performed only for those signals whose parameter value is below a threshold value.

5. A method in accordance with claim 2 further comprising separately processing signals whose parameters value is not greater than the reference value as events generated by a light source.

6. A method in accordance with claim 5 wherein said step of separately processing is performed only for those signals whose parameter value is below a threshold value.

7. A method in accordance with claim 2 further comprising determining the actual rate of scintillation events on the basis of the rate of processed scintillation events and the rate of detected single electron events.

8. A method in accordance with claim 1 wherein the detector output is an anode at which the signals appear and said step of determining is performed in a center of gravity discriminator.

9. A method in accordance with claim 8 wherein the detector has a characteristic output signal decay time and the discriminator includes a double delay line circuit composed of two delay lines each producing a time delay greater than the decay time.

10. A method in accordance with claim 8 wherein said step of determining is performed by deriving an integrated signal which is a time integral of the signal at the detector output, the integrated signal having an associated center of gravity and a maximum value within the time window, the discriminator has two constant fraction discriminator members each responsive to an integrated signal value which is a selected fraction of the maximum value, a different fraction value being associated with each discriminator member, and said step of determining is further performed by determining the time interval between the responses of the two discriminator members, which time interval is the parameter value.

11. A method in accordance with claim 1 wherein the events measured are created in a scintillator in response to radiation from a radioactive source, and further comprising comparing each signal parameter value with a threshold value which is independent of the reference value, and processing each signal whose parameter value is greater than the threshold value as a scintillation event.

* * * * *